United States Patent
Fisher-Jeffes et al.

(10) Patent No.: US 8,027,371 B2
(45) Date of Patent: Sep. 27, 2011

(54) COMBINE TIME MULTIPLEXED PILOT (TMP) DEROTATION WITH DESCRAMBLING AND DESPREADING IN DATA CORRELATORS USED BY RAKE RECEIVERS

(75) Inventors: Timothy Fisher-Jeffes, Cambridge, MA (US); Dilip Muthukrishnan, Cedar Park, TX (US)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 777 days.

(21) Appl. No.: 12/103,177

(22) Filed: Apr. 15, 2008

(65) Prior Publication Data
US 2008/0260009 A1  Oct. 23, 2008

Related U.S. Application Data

(60) Provisional application No. 60/925,331, filed on Apr. 19, 2007.

(51) Int. Cl.
*H04B 1/00* (2006.01)
(52) U.S. Cl. ........ 375/142; 375/150; 375/343; 370/500; 370/515
(58) Field of Classification Search ........... 375/140, 375/141, 142, 143, 147, 150, 152, 343; 370/500, 370/515, 320, 335, 342, 441; 708/5, 8, 422, 708/845
See application file for complete search history.

(56) References Cited

U.S. PATENT DOCUMENTS

| | | | |
|---|---|---|---|
| 5,687,166 A * | 11/1997 | Natali et al. | 370/209 |
| 6,363,102 B1 | 3/2002 | Ling | |
| 7,103,091 B2 | 9/2006 | Cervini | |
| 2001/0030992 A1 * | 10/2001 | Kim et al. | 375/148 |
| 2003/0067962 A1 * | 4/2003 | Yellin | 375/130 |
| 2004/0062215 A1 | 4/2004 | Sato | |
| 2009/0189808 A1 * | 7/2009 | Chen | 342/357.12 |

OTHER PUBLICATIONS

Abeta S et al: "Performance Comparison between Time-Multiplexed Pilot Channel and Parallel Pilot Channel for Coherent Rake Combining in DS-CDMA Mobile Radio", Jul. 1998, pp. 1417-1425, IEICE Trans. Commun., vol. E81-B, No. 7, Tokyo, JP, XP000790175, ISSN: 0916-8516.

* cited by examiner

*Primary Examiner* — Dac Ha
(74) *Attorney, Agent, or Firm* — Winston Hsu; Scott Margo

(57) ABSTRACT

The invention provides a code modification circuit for receiving a descrambling/dispreading code at a first input pair thereof and a pilot derotation code at a second input pair thereof, and arranged to combine the codes to form a combined code for providing to a correlator such that the correlator can recover data or a pilot signal from an input sequence supplied thereto.

10 Claims, 6 Drawing Sheets

COMBINE TIME MULTIPLEXED PILOT (TMP) DEROTATION WITH DESCRAMBLING AND DESPREADING IN DATA CORRELATORS USED BY RAKE RECEIVERS

RELATED APPLICATION

This application claims priority to U.S. Patent Application No. 60/925,331 filed on Apr. 19, 2007, the contents of which are incorporated herein by reference.

FIELD OF THE INVENTION

The present invention relates to rake receivers, and in particular to reducing the number of correlators therein.

BACKGROUND TO INVENTION

Radio telecommunications systems using code division multiple access (CDMA) transmit multiple channels simultaneously in the same frequency band.

As shown in FIG. 1, a baseband signal 2 for transmission, which as used herein includes digital signals which may have been processed by a processor 4 to compress them, is modulated by a modulator 6 using a modulation scheme such as Quaternary phase shift keying (QPSK) or quadrature amplitude modulation (QAM) so as to define a sequence of "symbols" that are to be transmitted.

The symbols have both an in phase and imaginary component, and occur at a rate known as a symbol rate. The symbols from the modulator undergo two further processing operations prior to transmission.

The symbols are spread by a spreading code 8 so as to spread the data from each symbol. The spread data is then further multiplied by a scramble code 10 which is specific to the cell that the mobile or base station is operating in. The result of these processes is to generate "chips" which are then transmitted follow up-conversion 12 to the desired transmit frequency.

The spreading codes are selected such that they make the symbols mutually orthogonal. This condition applies whilst all of the chips are in time alignment (which is easy to achieve at the transmitter) but the occurrence of multiple transmission paths in the propagation channel between the transmitter and receiver can result in multiple versions of the same transmit sequence of chips arriving with different time delays and amplitudes at the receiver, as shown in FIG. 2.

One method of recovering the transmitted data is to use a rake receiver.

A rake receiver is schematically shown in FIG. 3. It comprises a plurality of individual processing channels 30-1, 30-2 to 30-N, known as fingers. Each finger allows the relative time alignment between the received signal and a despreading/descrambling code to be adjusted. This enables signal power from each significant transmission path to be recovered and brought into time alignment at a combiner.

Within the rake receiver, the correlators within each finger act to correlate the received real and imaginary data from the radio frequency front end against the scrambling code and the spreading code thereby undoing the coding used at the transmitter. Each finger contains several correlators.

In transmit mode diversity systems having time multiplexed pilot signals it is known to modify one of the correlators within at least one of the fingers of the rake to include two further correlators for correlating the time multiplexed pilot (TMP) signals from antenna A and antenna B. The additional correlators are provided "down stream" of the correlators used to process incoming chips.

FIG. 4 illustrates a prior art topology used within one correlation path (of which there are several) in a rake finger. It should be noted that each finger correlates against early, on time, and late versions of a channel pilot signal and also against several potential data streams. Thus the arrangement of FIG. 4 can be regarded as a single processing channel within a finger and there will be several such channels within any given one of the fingers within the rake receiver. The channel comprises three correlators, numbered 30, 32 and 34. Each correlator has the same internal construction. Each correlator works in a known manner to form a running total of the result of multiplying an input signal to the correlator by a descrambling code, despreading code or time multiplexed pilot derotate code, as appropriate, and to output the result of the running total over each symbol length for each code.

In practice two time multiplexed pilot correlators 32 and 34 are provided in a single one of the channels of the rake receiver. The other channels within the rake receiver do not need to handle the time multiplexed pilot derotation and hence they can be simplified by omission of the correlators 32 and 34.

SUMMARY OF THE INVENTION

According to a first aspect of the present invention there is provided a code modification circuit for receiving a descrambling/despreading code at a first input pair thereof and a pilot derotation code at a second input pair thereof, and arranged to combine the codes to form a combined code for providing to a correlator such that the correlator can recover data or a pilot signal from an input sequence supplied thereto.

According to a second aspect of the present invention there is provided a method of recovering a time multiplexed pilot signal, comprising the steps of combining a despreading and descrambling code with a pilot code to create a combined code that is suitable for use by a single correlator to retrieve the pilot signal from a data stream.

According to a third aspect of the present invention there is provided a rake receiver having a code modification circuit therein for combining descrambling and de-spreading codes and time multiplexed pilot recovery codes into a combined code for use by a single correlator to receive a pilot signal.

According to a fourth aspect of the present invention there is provided a rake receiver including a descrambling code generator wherein the generator generates a code which combines the spreading code and scrambling code into a correlation code for use by a correlator such that the correlator correlates against the spreading code and scrambling code simultaneously.

BRIEF DESCRIPTION OF THE DRAWINGS

The present invention will now be described, by way of non-limiting example, with reference to the accompanying Figures in which.

DESCRIPTION OF PREFERRED EMBODIMENTS OF THE INVENTION

The inventors have realised that all the correlation operations, namely despread, descramble and TMP correlation can be performed in a single correlator. In a first combining step they noted that a single data correlator can correlate against both despread and descramble codes as the combined code is an exclusive OR (XOR) operation of both elements of the complex binary scrambling code with the real binary spreading code. Recovering the symbol is sometimes described as derotating the chips.

$$\text{derotate} = \text{Spread} \oplus \text{Scram}_I - j \cdot \text{Spread} \oplus \text{Scram}_q = (\pm 1 \mp j)$$

where $\oplus$ represents an XOR operation.

The application of the combined scrambling and spreading code results in a de-rotation operation of one of $-3\pi/4$, $\pi/4$, $-\pi/4$ or $\pi/4$ radians.

If as part of the same operation a constant $-\pi/4$ $(1-j)$ rotation is also applied then the de-rotation becomes $-\pi/2$, $\pi$, 0 or $\pi/2$. This can be done with sign negation and real and imaginary swapping.

The reason for this unorthodox mapping is that the complex conjugate of the descrambling code is required for de-rotation $$\text{correlate} = (\pm 1 \mp j) \cdot (1-j) \cdot RxIQ$$

or, in full if derotate=00 implies correlate=$-j \cdot R_x IQ$
if derotate=01 implies correlate=$-R_x IQ$
if derotate=10 implies correlate=$R_x IQ$
if derotate=11 implies correlate=$j \cdot R_x IQ$ The correlators can then be constructed in dedicated hardware.

Figure 1:
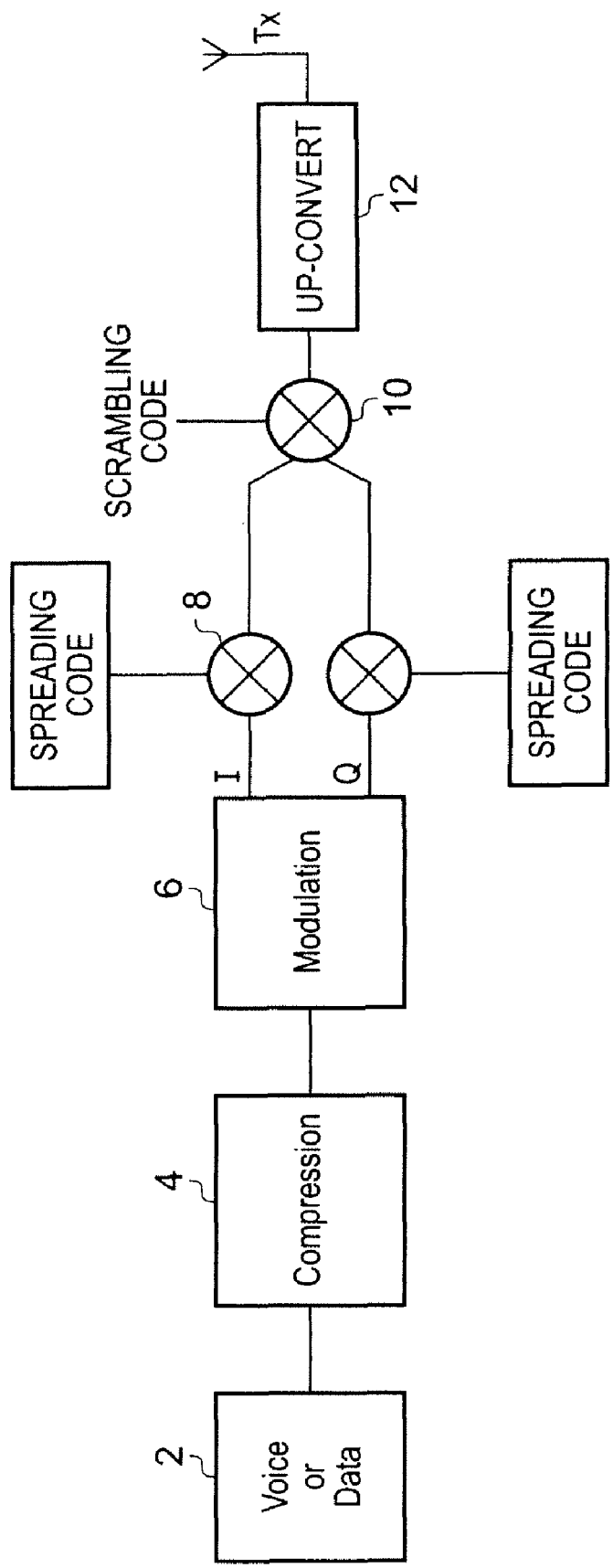
FIG. 1 schematically illustrates the steps used to encode data in a code division multiplexed access system.
Figure 2:
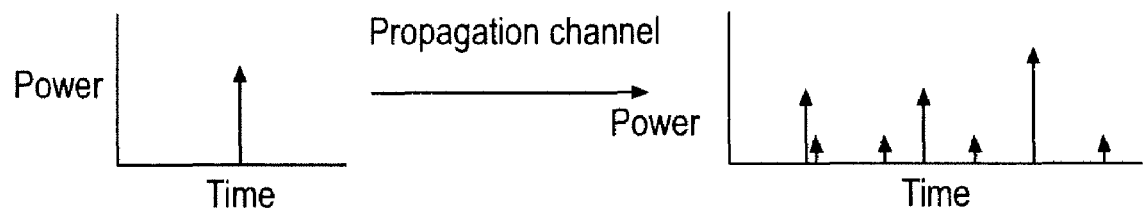
FIG. 2 schematically illustrates the consequence of multipath distortion on the propagation of a signal.
Figure 3:
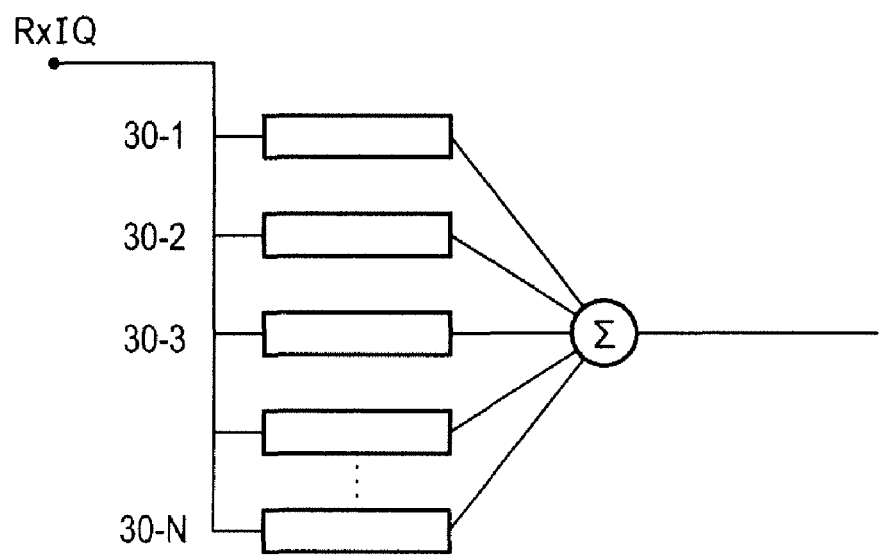
FIG. 3 schematically illustrates a rake receiver architecture.
Figure 4:
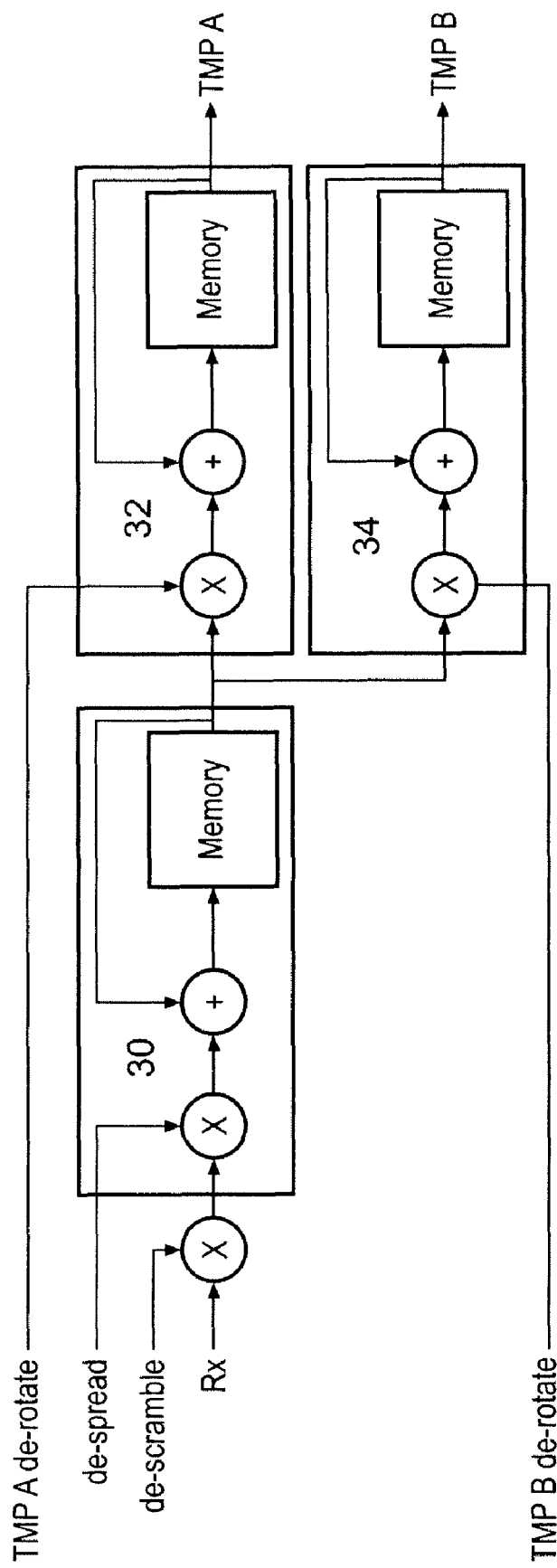
FIG. 4 illustrates a prior art configuration within a rake receiver for recovering a time multiplexed pilot as used in a transmit diversity mode CDMA system.
Figure 5:
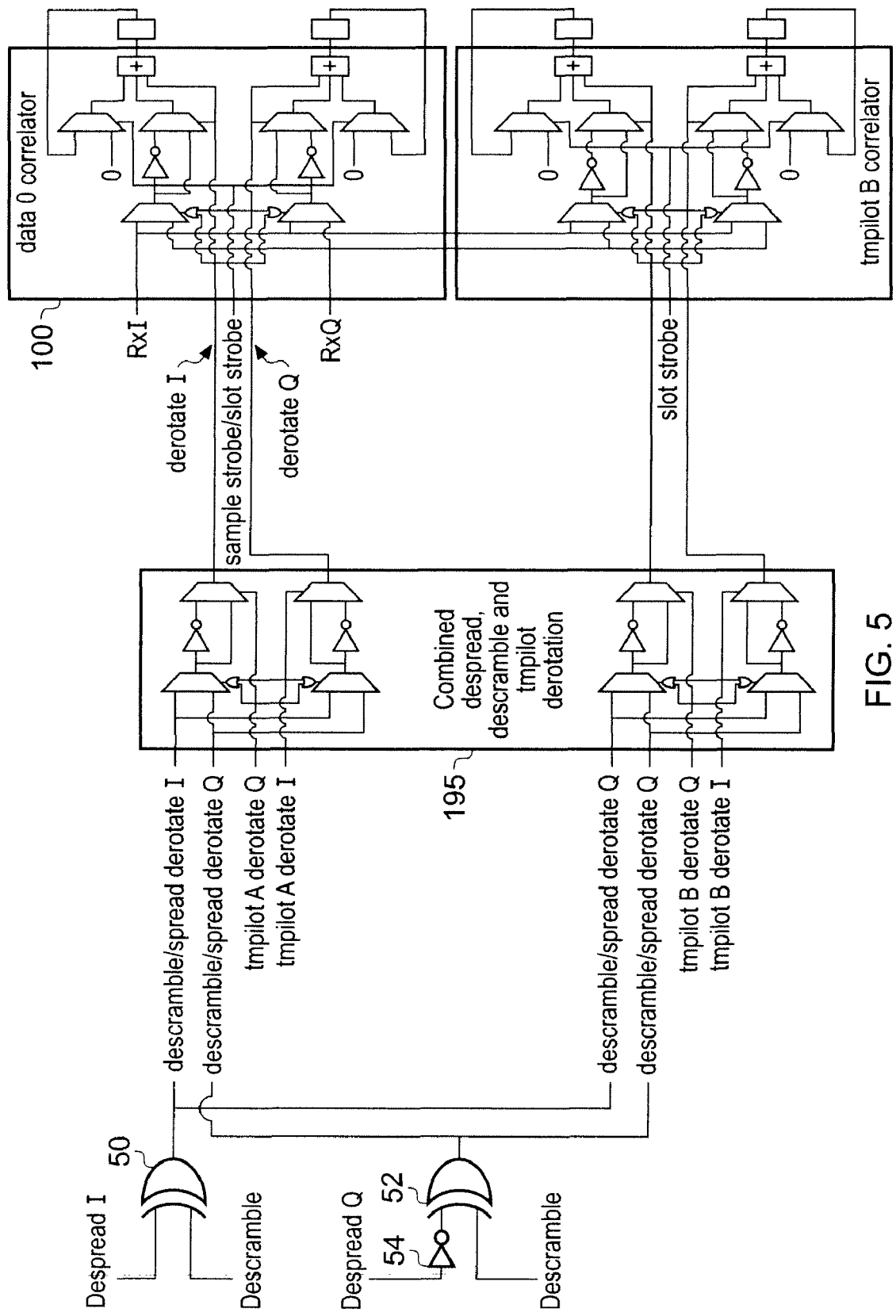
FIG. 5 illustrates a de-scrambling/de-spreading/TMP de-rotate codes combiner constituting an embodiment of the invention in combination with a pair of correlators.

The generation of the combined derotate and descramble code can therefore be provided by the exclusive OR gates 50 and 52 shown in FIG. 5, where the second exclusive OR gate 52 operates on an inverted version of the imaginary part of the spreading code, where such inversion can either be done at the spreading code generator embedded within the mobile device, by fabricating an inverter at the input to the exclusive OR gate, or as shown in FIG. 5, by providing a separate inverter 54 in the signal path for the imaginary part of the spreading code to the exclusive OR gate 52.

This reduces the number of correlators within this portion of a rake receiver and given that a rake receiver may have between 8 to 16 fingers, this saving is multiplied by the number of fingers so that space saving on the silicon die can become significant.

The correlator 100 comprises two channels. These are an "I" channel for processing the in-phase signal $R_x I$ from a quadrature detector radio frequency front end, and a Q channel for processing the out of phase signal $R_x Q$ from the quadrature detector radio frequency front end. The channels are identical and for brevity only one of the channels will be described in detail.

Figure 6:
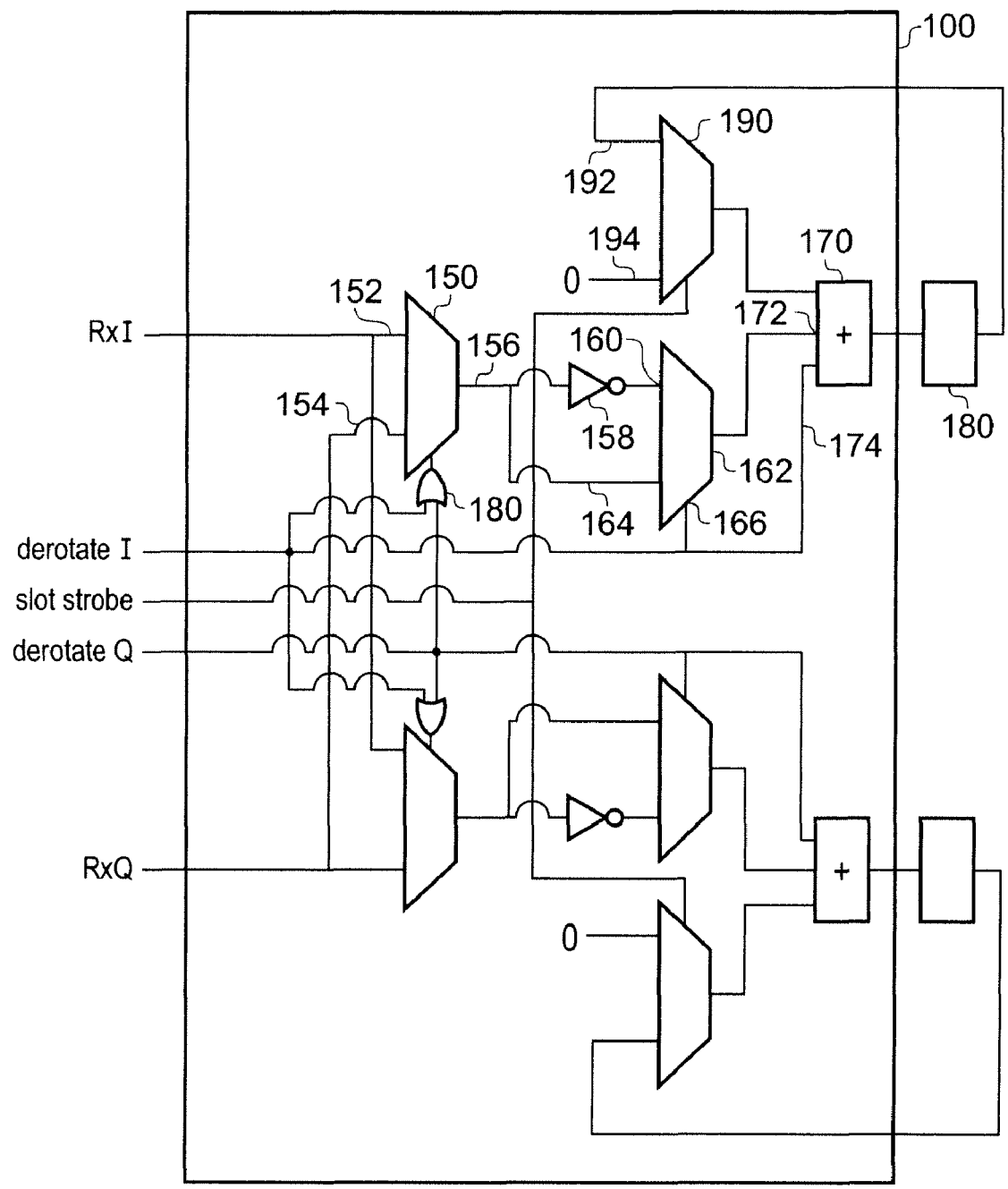
FIG. 6 shows a correlator circuit in detail.

With reference to FIG. 6, the I channel of the correlator comprises a first multiplexer 150 having a first input 152 connected to receive the in-phase signal $R_x I$ and a second input 154 connected to receive the out of phase signal $R_x Q$.

An output 156 of the first multiplexer 150 is provided via a negator 158 to a first input 160 of a second multiplexer 162 and also directly to a second input 164 of the multiplexer 162. An output of the multiplexer 162 is provided to a first input 172 of a summer 170. A third (carry-in) input 174 of the summer 170 is connected to receive a "derotate I" signal provided to a derotate I input. The "derotate I" signal is also provided to a control terminal 166 of the multiplexer 162 so as to determine which of its inputs is propagated to its output. The components 158 and 162 and the input 174 to the summer 170 act to achieve operational negation of the output 156 of the first multiplexer 150. These components could be replaced by an arithmetic negation circuit. The derotate I signal is also provided to the first input of an exclusive OR gate 180 which has a second input supplied with a "derotate Q" signal supplied to a derotate Q input of the correlator. An output of the exclusive OR gate 180 is connected to an input selected terminal of the multiplexer 150 so as to determine which of its inputs is selected to be output. The derotate I and derotate Q contain the code sequence for performing despreading and descrambling, and optionally time multiplexed pilot recovery, in a single correlation code.

An output of the adder 170 is provided to a memory 180 which stores the output from the adder. The value in the memory 180 (which is a multi-bit word) can be provided as an integrated output of the correlator at the end of a correlation sequence, but also provides a running total within the correlation sequence. An output of the memory, which advantageously is implemented as random access memory, is provided to a first input 192 of a third multiplexer 190 which has its second input 194 connected to "zero". An input select terminal of the multiplexer 190 is connected to a "slot strobe" signal which selects the second input 194 when asserted. In general the third multiplexer acts to return the output of the store 180 to the third input of the adder 170. The Q channel is similar to the I channel, and as shown in FIG. 6 is effectively a mirror image of it.

Figure 7:
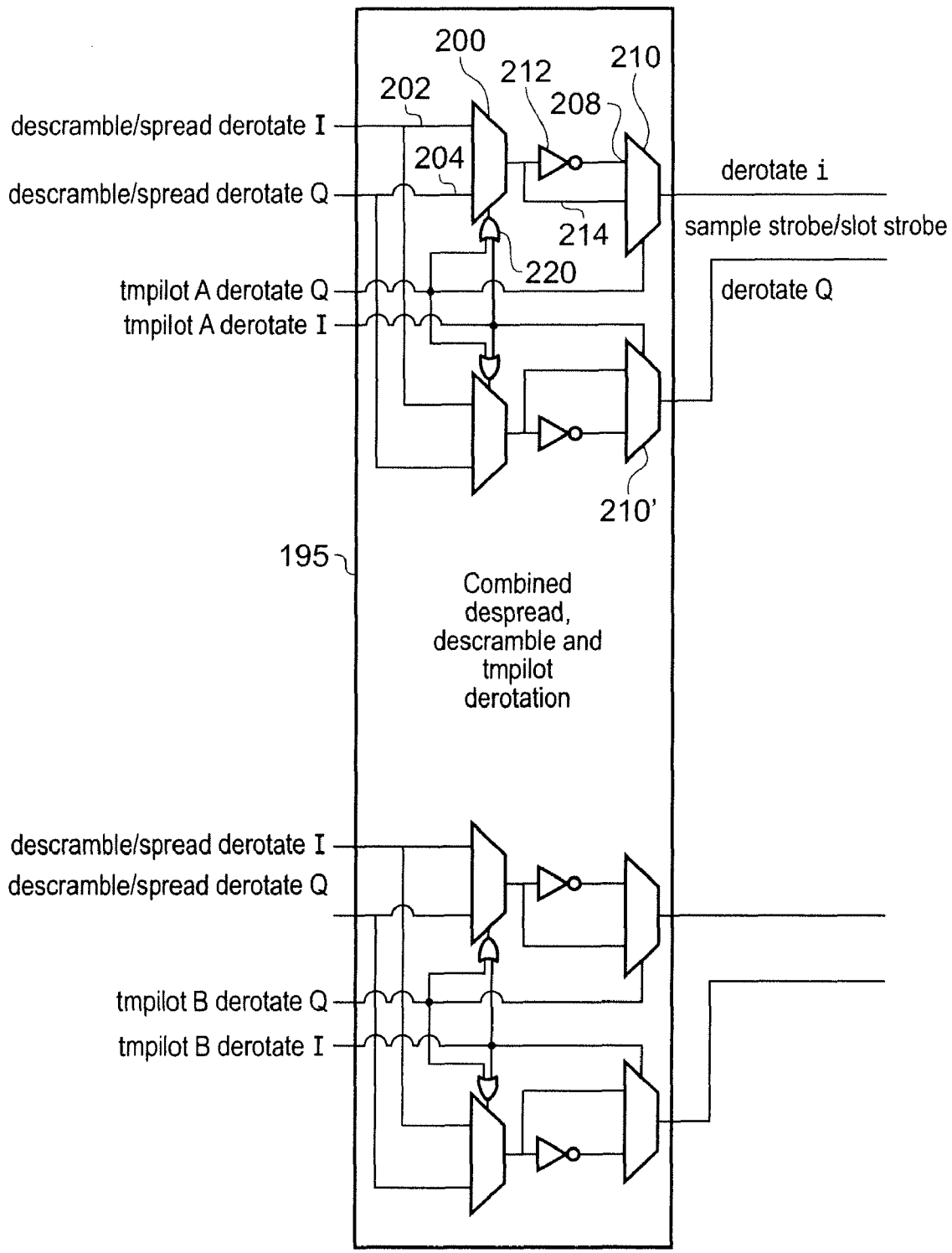
FIG. 7 shows an embodiment of the code combiner circuit in detail.

The code modification circuit 195 for forming the modified descrambling/de-rotation codes is shown in FIG. 7. The circuits for the DATA/TMP A and TMP B correlators are identical and only one will be described for the sake of brevity.

Within each code modification circuit there are two channels, one for generating the derotate I signal and one for the derotate Q signal. The channels are very similar, so for simplicity we need only describe one of them in detail.

A first multiplexer 200 has a first input 202 connected to receive a descramble/derotate I signal and a second input 204 connected to receive a descramble/derotate Q signal (generated by XOR gates 50 and 52, respectively). An output 206 of the multiplexer 206 is provided to a first input 208 of a second multiplexer 210 via an inverter 212. The output 206 is also provided directly to the second input 214 of the second multiplexer 210. An output of the second multiplexer 210 represents the derotate I signal.

The circuit also receives derotation Q and I signals for the pilot TMP A. The derotate Q signal is provided to an input select terminal of the second multiplexer 210. The TMP A derotate Q and TMP A derotate I signals are also provided as inputs to an XOR gate 220 which has an output connected to an input select terminal of the first multiplexer 200.

The second channel is like the first channel but the derotate I signal is provided to the input select terminal of the second multiplexer 210' and the negated and non-negated inputs are swapped over compared to the first channel.

This additional circuit provides an extra term during correlation of the TMP signals. The combined/correlation derotate is $$\text{correlate} = (\pm 1 \mp j) \cdot (1+j) \cdot (\pm 1 \mp j) \cdot (1-j) \cdot RxIQ = [(\pm 1 \pm j) \cdot (1+j) \cdot (\pm 1 \mp j)] \cdot (1-j) \cdot RxIQ$$

where the terms within the square brackets are provided by the circuit 195.

This gives an equivalent function to the prior art arrangement, but with fewer correlators and hence a saving in silicon foot print and power.

The invention claimed is:

1. A code modification circuit for receiving a descrambling/dispreading code at a first input pair thereof and a pilot derotation code at a second input pair thereof, and arranged to combine the codes to form a combined code for providing to a correlator such that the correlator can recover data or a pilot signal from an input sequence supplied thereto, the code modification circuit further comprising a circuit for adding a $-\pi/4(1-j)$ rotation to simplify all further de-rotation operations.

2. A code modification circuit as claimed in claim 1, where the first input pair is adapted to receive a descramble/despread I signal and a descramble/despread Q signal, and the second input pair is adapted to receive a pilot derotate I signal and pilot derotate Q signal.

3. A code modification circuit as claimed in claim 2, where one of the descramble/derotate I and descramble/derotate Q signals is selected for output if the pilot derotate I signal and the pilot derotate Q signal have the same instantaneous value, and the other one of the descramble/derotate I and Q signals is selected for output if the pilot derotate I and Q signals have different instantaneous values.

4. A code modification circuit as claimed in claim 3, in which the output signal is selected to be inverted or negated as a function of one of the pilot signals.

5. A code modification circuit as claimed in claim 1, in combination with a correlator.

6. A method of recovering a time multiplexed pilot signal, comprising the steps of combining a dispreading and descrambling code with a pilot code to create a combined code that is suitable for use by a single correlator to retrieve the pilot signal from a data stream, wherein the method comprises forming the sum correlate=$(_{-}^{+}1_{+}^{-}j) \cdot (1+j) \cdot (_{-}^{+}1_{+}^{-}j) \cdot (1-j) \cdot RxIQ$.

7. A rake receiver having a code modification circuit therein for combining descrambling codes and time multiplied pilot recovery codes into a combined code for use by a single correlator to receive a pilot signal, the rake receiver further comprising a circuit for adding a $-\pi/4(1-j)$ rotation to simplify all further de-rotation operations.

8. A rake receiver including a descrambling code generator wherein the generator generates a code which combines the spreading code and scrambling code into a correlation code for use by a correlator such that the correlator correlates against the spreading code and scrambling code simultaneously, the rake receiver further comprising a circuit for adding a $-\pi/4(1-j)$ rotation to simplify all further de-rotation operations.

9. A rake receiver as claimed in claim 8, further including a code modifying the correlation code such that it includes a contribution for a time multiplexed pilot code such that a single correlator correlates against a spreading code, a scrambling code and a time multiplexed pilot code simultaneously.

10. A code modification circuit for receiving a descrambling/dispreading code at a first input pair thereof and a pilot derotation code at a second input pair thereof, and arranged to combine the codes to form a combined code for providing to a correlator such that the correlator can recover data or a pilot signal from an input sequence supplied thereto, where the first input pair is adapted to receive a descramble/despread I signal and a descramble/despread Q signal, and the second input pair is adapted to receive a pilot derotate I signal and pilot derotate Q signal, and wherein one of the descramble/derotate I and descramble/derotate Q signals is selected for output if the pilot derotate I signal and the pilot derotate Q signal have the same instantaneous value, and the other one of the descramble/derotate I and Q signals is selected for output if the pilot derotate I and Q signals have different instantaneous values.

* * * * *